E. BESAG.
POLYPHASE CURRENT STARTER.
APPLICATION FILED SEPT. 15, 1913.

1,147,071.

Patented July 20, 1915.
2 SHEETS—SHEET 1.

E. BESAG.
POLYPHASE CURRENT STARTER.
APPLICATION FILED SEPT. 15, 1913.

1,147,071.

Patented July 20, 1915.
2 SHEETS—SHEET 2.

UNITED STATES PATENT OFFICE.

ERNST BESAG, OF FRANKFORT-ON-THE-MAIN, GERMANY, ASSIGNOR TO THE FIRM OF VOIGT & HAEFFNER ACTIEN GESELLSCHAFT, OF FRANKFORT-ON-THE-MAIN, GERMANY.

POLYPHASE-CURRENT STARTER.

1,147,071.   Specification of Letters Patent.   Patented July 20, 1915.

Application filed September 15, 1913. Serial No. 789,909.

*To all whom it may concern:*

Be it known that I, ERNST BESAG, a subject of the German Emperor, and a resident of Frankfort-on-the-Main, Germany, have invented certain new and useful Improvements in Polyphase-Current Starters, of which the following is a specification.

In automatic polyphase current starters in which a motor always rotating in the same direction effects the closing of the stator switch and rotation of the rotor starter, the return of the rotor starter from the end to the initial position offers great difficulties. The arrangement becomes still more complicated, if it is desired to obtain an instantaneous closing of the stator circuit.

The present invention provides simple means for overcoming this difficulty. The disconnecting of the stator is then effected electrically by releasing a pawl mechanism between the stator switch proper and its driving lever. The motor, for initiating the closing movement of the stator switch drives a lever by means of a cam, until the lever comes into engagement with the stator switch, and at the same time tensions a spring for the stator switch. This time is however also utilized for advancing the rotor starter in the same direction of rotation as in starting, so that its contact brushes move from the end position into the initial position next thereto. At the moment of closing the stator switch, the contact lever of the rotor starter is therefore in the correct position for starting. The further movement of the starting motor brings the contact brushes of the rotor starter into the end position for normal running of the motor to be started, when the starting motor is disconnected by any well known arrangement.

Figure 1:
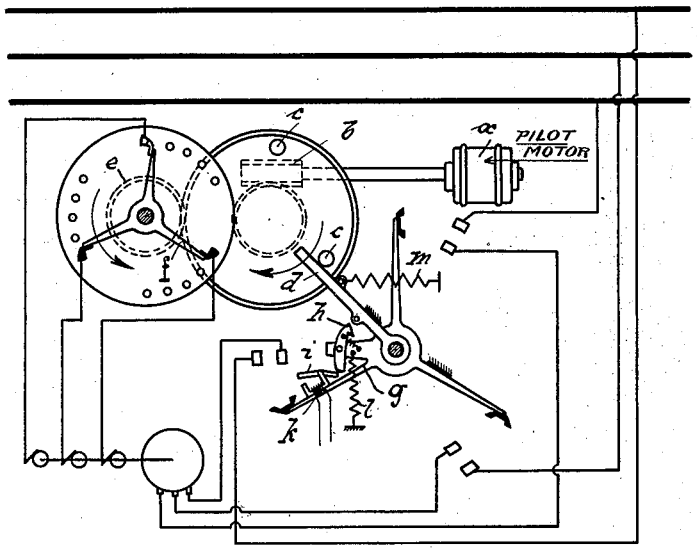
Figure 2:
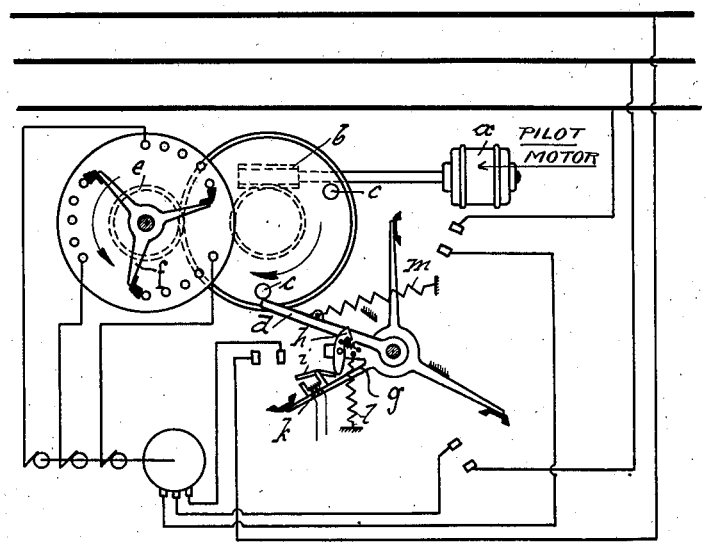
Figure 3:
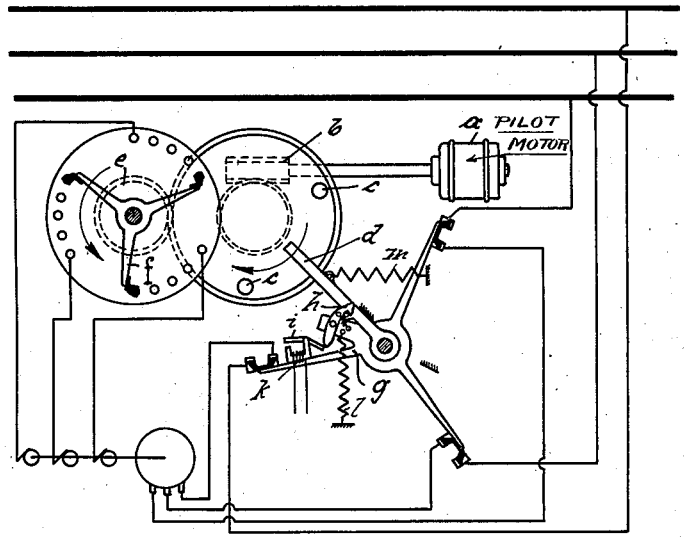
Figure 4:
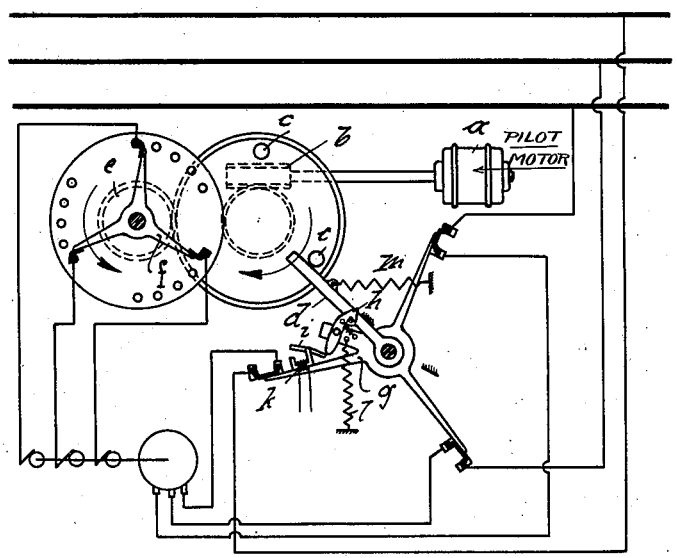

Figure 1 is a diagrammatic view showing the parts in the positions occupied when the stator switch is opened; Fig. 2 is a similar view showing the parts in the positions assumed just prior to the stator switch being closed; Fig. 3 illustrates the relation of the several parts at the instant the stator switch is closed; Fig. 4 shows the positions when the motor has attained its normal speed.

The invention is further described and exemplified by a construction illustrated in the accompanying drawings. The four positions coming into question are shown.

$a$ is the auxiliary motor which, by means of the gear $b$ and the cams $c$ acts on the driving lever $d$ of the stator switch, and by means of the transmission gear $e$, on the contact lever $f$ of the rotor starter. The driving lever $d$ loosely movable on the spindle of the stator switch, can be coupled to the stator switch $g$ by means of a pawl $h$ which is drawn out of engagement with the lever $d$ by the armature $i$ of a coil $k$. When the pawl is disengaged, the spring $l$ returns the stator switch to the disconnected position. The spring $m$ is used for closing the stator switch. The starting position of the rotor starter is shown in Figs. 2 and 3, and the end position in Figs. 1 and 4.

Fig. 1 shows the arrangement after disconnection. The pawl connection between the driving lever $d$ and the stator switch $g$, is broken, and the contact lever $f$ of the rotor starter is in the end position. When the auxiliary motor $a$ is operated, it drives the lever $d$ by means of one of the cams $c$, until the lever comes into engagement with the stator switch $g$ through the action of the pawl $h$. In this way the closing spring $m$ for the stator switch is tensioned. During the time required for the movement in question the contact lever $f$ of the rotor starter is however moved by the action of the transmission gear $e$ from the position shown in Fig. 1 to the starting position shown in Figs. 2 and 3.

Fig. 2 shows the position of the parts immediately before the cam $c$ slides off from the lever $d$. An instant later, this sliding off takes place, and the previously tensioned spring $m$ pulls the lever $d$ and the stator switch $g$ connected to the latter by the pawl, into the closing position of the stator switch, shown in Fig. 3. The stator switch is then in its closed position, and the rotor starter in the position for starting. Owing to continued rotation of the auxiliary motor $a$, the lever of the rotor starter is carried over the contacts, until the position shown in Fig. 4 is reached, and the motor to be started has reached its normal number of revolutions. In this position, the auxiliary motor is disconnected in a well known manner.

For the purpose of stopping the working motor, the coil $k$ is supplied with current, which attracts its armature $i$, so that the latter forces the pawl $h$ out of engagement with the lever $d$, and the spring $l$ brings the stator switch into the open position (see Fig. 1).

The coil $k$ can be made as a tension coil, as a maximum relay and, with a slight modification, as a minimum relay, etc., without exceeding the scope of the invention.

What I claim as my invention is:

1. In an automatic polyphase current motor starting mechanism, the combination of a stator switch, a rotor starter, a motor adapted to turn in one direction only, gearing connecting the motor and rotor starter, a spring for closing the stator switch, and means whereby when the rotor starter is being turned to starting position said spring will be placed under tension and released to automatically close the stator switch as the rotor starter reaches starting position.

2. In an automatic polyphase current motor starting mechanism, the combination of a stator switch, a rotor starter, a motor adapted to turn in one direction only, gearing connecting the motor and rotor starter, a lever movable about the axis of the stator switch, means for connecting said lever and stator switch by movement of the lever in one direction, a spring for closing the stator switch adapted to be placed under tension by said movement of the lever, and means turning with the rotor starter adapted to engage the lever and rock the same to engage the stator switch while the rotor starter is moving to starting position, said lever being released and the stator switch closed as the rotor starter reaches such starting position.

3. In an automatic polyphase current motor starting mechanism, the combination of a stator switch, a spring for closing said switch, a rotor starter, a motor, and means actuated by the motor for placing the spring of the stator switch under tension and simultaneously adjusting the rotor starter to starting position.

4. In an automatic polyphase current motor starting mechanism, the combination of a stator switch, a lever adapted to be connected with said switch to actuate it, a spring for closing the stator switch, a rotor starter, a motor, means driven by the motor adapted to intermittently engage said lever to place the stator switch closing spring under tension, and means driven by the motor for turning the rotor starter from its "end" to its starting position while said lever is connected with the motor.

5. In an automatic polyphase current motor starting mechanism, the combination of a stator switch, springs adapted to open and close said switch, a lever, means for engaging the lever and stator switch, a rotor starter, a motor, gearing connecting the motor and rotor starter, and means geared to the motor and adapted to intermittently engage the lever, whereby said lever will be engaged with the stator switch and the spring for closing said switch placed under tension while the rotor starter is being turned to starting position, the lever being released and the stator switch closed as the rotor starter arrives at starting position.

In testimony whereof I affix my signature in presence of two witnesses.

ERNST BESAG.

Witnesses:
 ERWIN DIVESEL,
 LOFIC DICHL.